(12) United States Patent
Bahns et al.

(10) Patent No.: US 9,816,062 B2
(45) Date of Patent: Nov. 14, 2017

(54) METHOD FOR LAUTERING WORT

(71) Applicant: GEA Brewery Systems GmbH, Kitzingen (DE)

(72) Inventors: Patrick Bahns, Kitzingen (DE); Matthias Gerner, Kitzingen (DE)

(73) Assignee: GEA BREWERY SYSTEMS GMBH, Kitzingen (DE)

( * ) Notice: Subject to any disclaimer, the term of this patent is extended or adjusted under 35 U.S.C. 154(b) by 244 days.

(21) Appl. No.: 14/725,346

(22) Filed: May 29, 2015

(65) Prior Publication Data
US 2015/0353874 A1    Dec. 10, 2015

(30) Foreign Application Priority Data

Jun. 6, 2014   (DE) .................. 10 2014 108 011

(51) Int. Cl.
   *C12C 7/14*    (2006.01)
   *C12C 7/17*    (2006.01)
(52) U.S. Cl.
   CPC . *C12C 7/14* (2013.01); *C12C 7/17* (2013.01)
(58) Field of Classification Search
   CPC .................................. C12C 7/14; C12C 7/17
   See application file for complete search history.

(56) References Cited

U.S. PATENT DOCUMENTS 5,522,305 A  *  6/1996  Widhopf ................ C12C 13/08
                                                                     426/29

FOREIGN PATENT DOCUMENTS

| DE | 235878 C | | 6/1911 |
|---|---|---|---|
| DE | 4344330 A1 | | 6/1995 |
| DE | 102008039373 A1 | | 2/2010 |
| DE | 102009004929 | * | 2/2010 |
| DE | 102009039258 A1 | | 3/2011 |
| DE | 102010030954 A1 | | 1/2012 |
| EP | 0597462 | * | 5/1994 |
| EP | 1683854 A1 | | 7/2006 |
| EP | 2404990 A1 | | 1/2012 |
| WO | 9208782 A1 | | 5/1992 |

OTHER PUBLICATIONS

English Translation for EP0597462 published May 1994.*
European Patent Office, Search Report, Application No. EP 15166259, Oct. 21, 2015, 2 pages.

* cited by examiner

*Primary Examiner* — Anthony Weier
(74) *Attorney, Agent, or Firm* — Quarles & Brady LLP

(57) ABSTRACT

A method and lauter tun for lautering wort includes a fluid gaseous medium introduced as a false bottom seal below a false bottom-of the lauter tun prior to lautering of the wort through the false bottom. The mash is transferred into the lauter tun above the false bottom after introduction of the false bottom seal. Wort running off in the lauter tun through the false bottom displaces the false bottom seal.

14 Claims, 3 Drawing Sheets

METHOD FOR LAUTERING WORT

CROSS-REFERENCE TO RELATED APPLICATIONS

This application claims priority to German Patent Application No. 10 2014 108 011.4 filed on Jun. 6, 2014, which is fully incorporated herein by reference.

STATEMENT REGARDING FEDERALLY SPONSORED RESEARCH OR DEVELOPMENT

Not applicable.

FIELD OF THE INVENTION

The invention relates to a method for lautering wort using a lauter tun. Furthermore, the invention relates to a lauter tun that is suitable for implementing the method according to the invention.

BACKGROUND OF THE INVENTION

In beer production or in the production of other products made from cereals, such as whiskey, kvass, malt extract and the like, lautering of the wort is one of the most important production steps. During lautering, the spent grains contained in the mash are filtered off so that an aqueous solution of the extract substances substantially free of solids, namely the wort, is obtained as an intermediate product.

Whenever the production of beer is mentioned hereinafter, it means all processes that employ a lauter tun. The further description uses the example of beer production.

In typical brewhouse installations, a lauter tun is used for lautering. To be able to filter the mash, a so-called false bottom is arranged in the lauter tun above the bottom of the tun, said false bottom having passage openings for the wort to run off. After the transfer of the mash in the lauter tun, a filtration layer composed of spent grains forms on the false bottom, by means of which the solids contained in the mash can be filtered off and can be separated from the wort. The spent grains remain in the lauter tun as a solid substance, whereas the wort flows downward through the false bottom and is drained from the lauter tun as an intermediate product. Conventional brewing methods prescribe that prior to the mash transfer, i.e. before the mash is pumped into the lauter tun, a so-called false bottom seal must be pumped into the lauter tun. Water, mostly hot water, is used as a typical false bottom seal. This liquid false bottom seal displaces the air from the space between the vessel bottom of the lauter tun and the false bottom prior to the mash transfer. Also, the air can be displaced from the wort collection pipes branching off from the bottom of the lauter tun and/or be displaced from the wort collection tank or the wort collection ring arranged at the end of the wort collection pipes by means of the liquid false bottom seal. Displacement of the air from the lauter tun by the false bottom seal is supposed to prevent the introduction of ambient oxygen into the wort running off because the properties of the wort would be deteriorated by the introduction of oxygen. Furthermore, the trapped air would block the openings of the false bottom, thus hindering filtration.

The introduction of water as a false bottom seal into the lauter tun is disadvantageous because the water of the false bottom seal dilutes the concentration of the wort. Depending on the type of beer to be produced, the water additionally introduced into the wort has to be evaporated later during wort boiling, which causes significant energy costs.

To reduce the negative effect on the wort concentration by the introduction of pure water as a false bottom seal into the lauter tun, DE 10 2010 030 954 A1 proposes introducing, as a false bottom seal, an aqueous medium that has been obtained at a different stage during the brewing process. Said aqueous medium can be in particular the discharge water used for discharging mash from the mash duct to the lauter tun. Since the discharge water itself contains residual extract, the wort concentration is not reduced as strongly as is the case when using pure water as a false bottom seal. However, a negative effect on the concentration of the wort cannot be entirely avoided in this method, either.

To avoid the negative effect on the concentration of the wort, DE 10 2010 030 954 A1 proposes using, as a false bottom seal, an aqueous medium that is provided for cleaning the lauter tun because this medium, too, contains extract, thus at least diminishing the undesired effect of reduction of the concentration.

All known lauter tuns and methods for operating lauter tuns are based on the use of liquid false bottom seals on a water basis. As a consequence, however, an additional degree of water is always mixed into the lautered wort because of the liquid false bottom seal, which is undesired in many cases. Moreover, the known lauter tuns for reducing said effect require a significant additional effort in installation.

SUMMARY OF THE INVENTION

Hence, it is the object of the present invention to propose a new lautering method and a new lauter tun by means of which the undesired reduction of the concentration of the wort by the aqueous false bottom seal is avoided.

The basic idea of the method according to the invention is to replace the aqueous false bottom seal with a gaseous false bottom seal. By using a gaseous medium for the false bottom seal, the admixture of additional water into the wort running off through the false bottom is completely avoided. Instead of flooding the area below the false bottom with an aqueous medium prior to the mash transfer, a gaseous medium is introduced into said area in the method according to the invention. The manner in which the introduction is performed is immaterial. The gaseous medium can be actively introduced, or the gaseous medium flows on its own into the area below the false bottom without any active measures. For example, this may happen in that the wort of a previous brew is pumped off and the area below the false bottom is thus ventilated with air from the environment. It is crucial for the method according to the invention that prior to the mash transfer of the next brew, a gaseous false bottom seal is present in the area below the false bottom instead of a liquid false bottom seal. If after the mash transfer the wort now flows downward through the false bottom, a dilution of the wort is precluded because the gaseous false bottom seal cannot be permanently mixed into the liquid wort.

Which areas of the lauter tun below the false bottom are filled by the gaseous false bottom seal prior to the mash transfer is basically optional. Preferably, prior to the mash transfer, the gaseous false bottom seal should fill the space between the bottom side of the false bottom and the top side of the bottom of the lauter tun and/or the wort collection pipes branching off from the bottom of the lauter tun and/or the wort collection tank arranged at the end of the wort collection pipes. Yet, of course, it is also possible without any problems that other areas along the run-off path of the wort are filled by a gaseous false bottom seal after lautering through the false bottom.

In the simplest form, air can be used for the gaseous false bottom seal. However, if the mash is transferred incorrectly, a larger amount of ambient oxygen may be trapped in the wort because of the incorrect mash transfer, for example in case of an excessive mash transfer speed through mash transfer openings that are arranged too far above the false bottom (e.g. in the area of the hood of the lauter tun), causing the ambient oxygen in the gaseous false bottom seal to have an at least slightly negative effect on the properties of the wort. To avoid said negative effect of the ambient oxygen on the properties of the wort, a gas that is free of oxygen, in particular an inert gas (e.g. nitrogen) or a carbon dioxide gas can also be used for the gaseous false bottom seal. If said oxygen-free gases are partially trapped by the wort, a negative influence on the properties of the wort is precluded because the gaseous false bottom seal does not contain any oxygen and thus no oxidation of the wort components has to be feared.

Oxygen-free gases can be obtained from the air by way of corresponding treatment methods (e.g. molecular sieves), for example. Carbon dioxide is particularly advantageous because it occurs in large amounts in any brewery during fermentation and is thus easily available.

However, the use of an oxygen-free gas for the false bottom seal causes certain additional costs for the provision of the corresponding gas volume. Said costs can be avoided if air is used for the false bottom seal. To avoid the negative effects of the oxygen contained in the air on the wort, a plurality of measures can be taken, in particular during mash transfer, which reduce or entirely avoid air being trapped in the mash and in the wort.

Trapping of parts of the gaseous false bottom seal in the wort can be prevented in particular if during the mash transfer the mash does not fall from above onto the false bottom out of mash transfer openings arranged at the ceiling of the lauter tun, but is conveyed into the lauter tun in the known manner from below through closable mash inlet openings arranged in the false bottom. An introduction through mash inlet openings arranged laterally in the wall of the vessel shortly above the false bottom is known, too. By way of the controlled inflow of the mash through the mash inlet openings arranged in the false bottom, it is achieved that the wort contained in the mash runs off downward through the false bottom in a controlled manner and at a moderate flow speed and, in doing so, displaces the gaseous false bottom seal step by step from the area of the lauter tun below the false bottom, in particular if the false bottom seal is air. Since it is precluded during the pumping-in of the mash through the mash inlet openings arranged in the false bottom that the mash completely covers all openings of the false bottom, in particular at the beginning of the mash transfer, the gaseous false bottom seal can be displaced upward step by step through the remaining openings of the false bottom by the wort that flows moderately downward. This is possible because the mash first accumulates around the mash inlet openings and floods the entire false bottom only in the further process of the mash transfer. Only after the entire gaseous false bottom seal has been completely displaced, the level of the wort increases far enough across the entire area of the false bottom for all passage openings of the false bottom to be covered by the wort. However, this is no longer important with respect to the displacement of the false bottom seal then because the gaseous false bottom seal has been completely displaced upward by the false bottom anyway.

With regard to the complete displacement of the gaseous false bottom seal through the openings of the false bottom, it is further advantageous if, at least temporarily, the mash is conveyed into the lauter tun through the different mash inlet openings at different conveying speeds. As a result, it can be achieved that the mash flows in more quickly on one side of the lauter tun than on the other side. In the areas in which the mash flows in more quickly, the wort also runs off faster through the false bottom and displaces the gaseous false bottom seal. In the areas in which the mash is conveyed in only very slowly or not at all, only little wort or no wort at all runs off, ensuring that the openings necessary for the upward passage of the false bottom seal in the false bottom or along the wort draining pipes are not blocked by the wort running off. This version of the method thus means in other words that because of the mash, which is initially unevenly transferred with respect to the area of the false bottom, the gaseous false bottom seal runs off into a defined predominant direction upward through the false bottom or through another opening, which is provided especially for draining the gaseous false bottom seal, for example.

To achieve different conveying speeds at the different mash inlet openings, one or more mash inlet openings can be at least temporarily closed or throttled. Through the closed or throttled mash inlet openings, no or less mash can be conveyed into the lauter tun, and no wort can thus run off downward in the corresponding areas around said mash inlet openings. The gaseous false bottom seal can then preferably be displaced upward through said areas.

To allow the spent grains to form an even bed above the false bottom, the conveying speeds of the mash in the different mash inlet openings should be equalized once the gaseous false bottom seal has been displaced by the wort running off. This can happen, for example, by registering the total amount of mash that has already been conveyed into the lauter tun through one or more of the unclosed mash inlet openings. As soon as the volume of the liquid portion of the supplied mash corresponds to the volume of the gaseous false bottom seal, it can be assumed that the gaseous false bottom seal has been substantially completely displaced. From this point forward, the conveying speeds in all mash inlet openings can be equalized, for which purpose all mash inlet openings are then opened in the same manner, for example.

Another measure for avoiding undesired gas cushions in the false bottom seal is to convey the wort with only relatively low conveying capacity into the lauter tun at least up to the point at which the gaseous false bottom seal has been completely displaced. The low conveying capacity ensures that the wort runs off only relatively slowly through the false bottom and thus not all openings in the false bottom and not all cross-sections in the wort draining pipes are blocked at once by the wort running off. The low conveying capacity can be easily achieved by means of a frequency converter at the motor of the pump or a regulating valve installed behind the pump. Also, an additional pump with lower conveying capacity is conceivable, which is used only at the beginning of the mash transfer. Once the gaseous false bottom seal has then been completely displaced, the conveying capacity can be readily increased for the mash transfer because the trapping of undesired gas cushions does not have to be feared any longer.

To avoid or reduce contaminations in the area of the false bottom seal with solids contained in the mash, it is advantageous if a low-solids fraction of the mash is pumped into the lauter tun at the beginning of the mash transfer. Additionally, the false bottom seal can form particularly quickly in this way because the liquid runs off through the false bottom and displaces the gaseous false bottom seal particularly quickly. After the complete displacement of the gaseous false bottom seal by the wort, the entire rest of the mash to be transferred can be pumped into the lauter tun including all solids. To obtain a low-solids fraction of the mash, mash can be taken from an upper area of the mash tun at the beginning of the mash transfer, for example, because the solids concentrate at the bottom of the mash tun if the speed of rotation of the stirring mechanism is reduced or if the stirring mechanism is even turned off, for example.

To further reduce the admixture of undesired water into the wort, it is further possible that the mash transfer duct, through which the mash is conveyed into the lauter tun, is not evacuated as usual at the end of the mash transfer by means of an aqueous medium but by means of a gaseous pressure medium. For example, the mash transfer duct can be evacuated by means of pressurized air, $CO_2$ or other gases (e.g. inert gases). Of course, the water volume in the mash transfer duct could also simply be discarded. However, this is not sensible for ecological and economical reasons.

The lauter tun according to the invention is characterized by an additional degassing duct that ends with a first end in the lauter tun below the false bottom. By means of said additional degassing duct, the displacement of the gaseous false bottom seal by the wort running off downward can be facilitated because the additional cross-section of the degassing duct gives the gaseous false bottom seal an additional possibility to flow out of the lauter tun. Even if all openings of the false bottom itself are closed, the gaseous false bottom seal can be drained from the area of the lauter tun below the false bottom through the degassing duct.

The point at which the first end of the degassing duct ends in the lauter tun in the area below the false bottom is basically optional. In a particularly advantageous fashion, the first end of the degassing duct is arranged in such a manner that the gaseous false bottom seal can flow out of the space between the false bottom and the bottom of the lauter tun and/or out of at least one wort collection pipe. It is also particularly advantageous if multiple degassing ducts are distributed across the circumference of the lauter tun and are connected to the area between the false bottom and the bottom of the lauter tun.

To prevent solids contained in the wort running off from entering the degassing duct and thus undesired contaminations in the degassing duct, it is particularly advantageous if a sieve or filter element is arranged in the degassing duct. By means of said sieve or filter element, the solid particles contained in the wort can be held back at least in part. The side of the sieve or filter element facing the first end of the degassing duct should be arranged in such a manner that it can be easily cleaned. Furthermore, the at least one degassing duct can be equipped with a shut-off valve, which allows the at least one duct to be shut off.

It is basically optional where the gaseous false bottom seal is drained to through the degassing duct. It is particularly advantageous, if said gaseous false bottom seal is displaced by the wort through the degassing duct into the lauter tun above the false bottom. For this purpose, the second end of the degassing duct is arranged on the lauter tun in such a manner that it ends in the lauter tun above the false bottom.

An embodiment of the invention is schematically illustrated in the drawings and will be explained by way of example in the following description.

DETAILED DESCRIPTION OF THE EXAMPLE EMBODIMENTS

Figure 1:
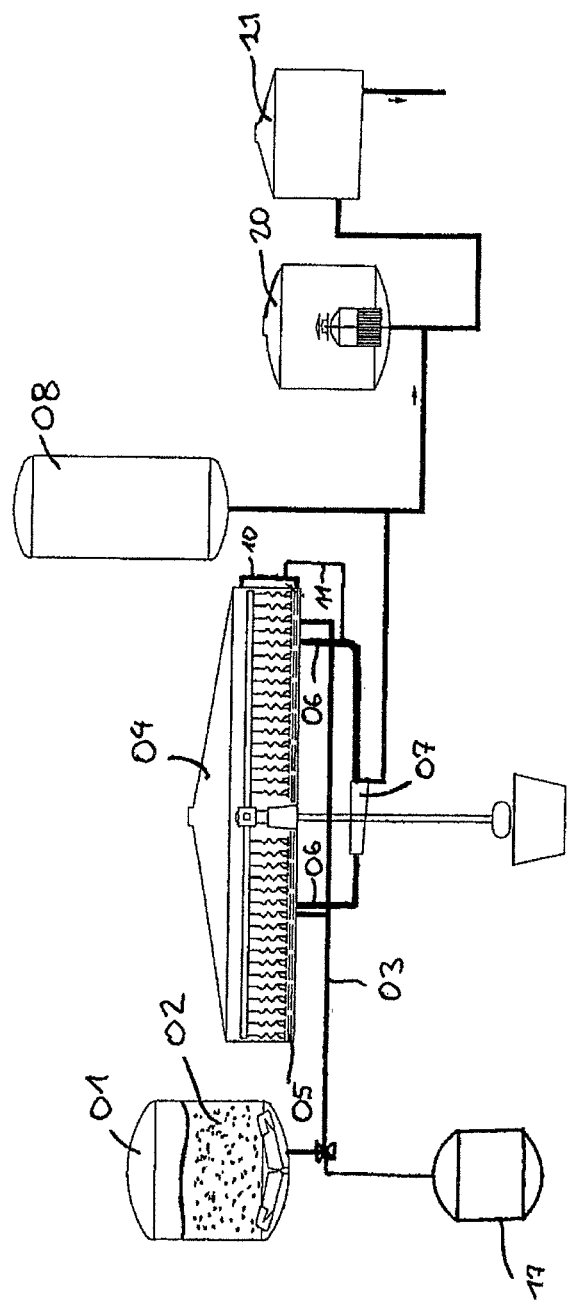
FIG. 1 shows a brewhouse installation including a lauter tun according to the invention in a schematic view.

FIG. 1 shows a brewhouse installation for beer wort production in a schematic view. The mash 02 can be produced and sugared in the known way in a mash tun 01 and can subsequently be pumped into a lauter tun 04 through a mash transfer duct 03.

During the lautering of the mash 02, the liquid components of the mash 02 run off downward through the false bottom 05 of the lauter tun 04. The wort then flows through wort collection pipes 06, which branch off from the bottom of the lauter tun, into a wort collection tank 07 or a wort collection ring. From there, the wort can be pumped into a wort buffer tank 08 or directly into a wort kettle 20 for wort boiling by means of pumps (not illustrated). From the wort kettle 20, the boiled wort then passes into a whirlpool 21, where the trub components can be separated from the wort.

Figure 2:
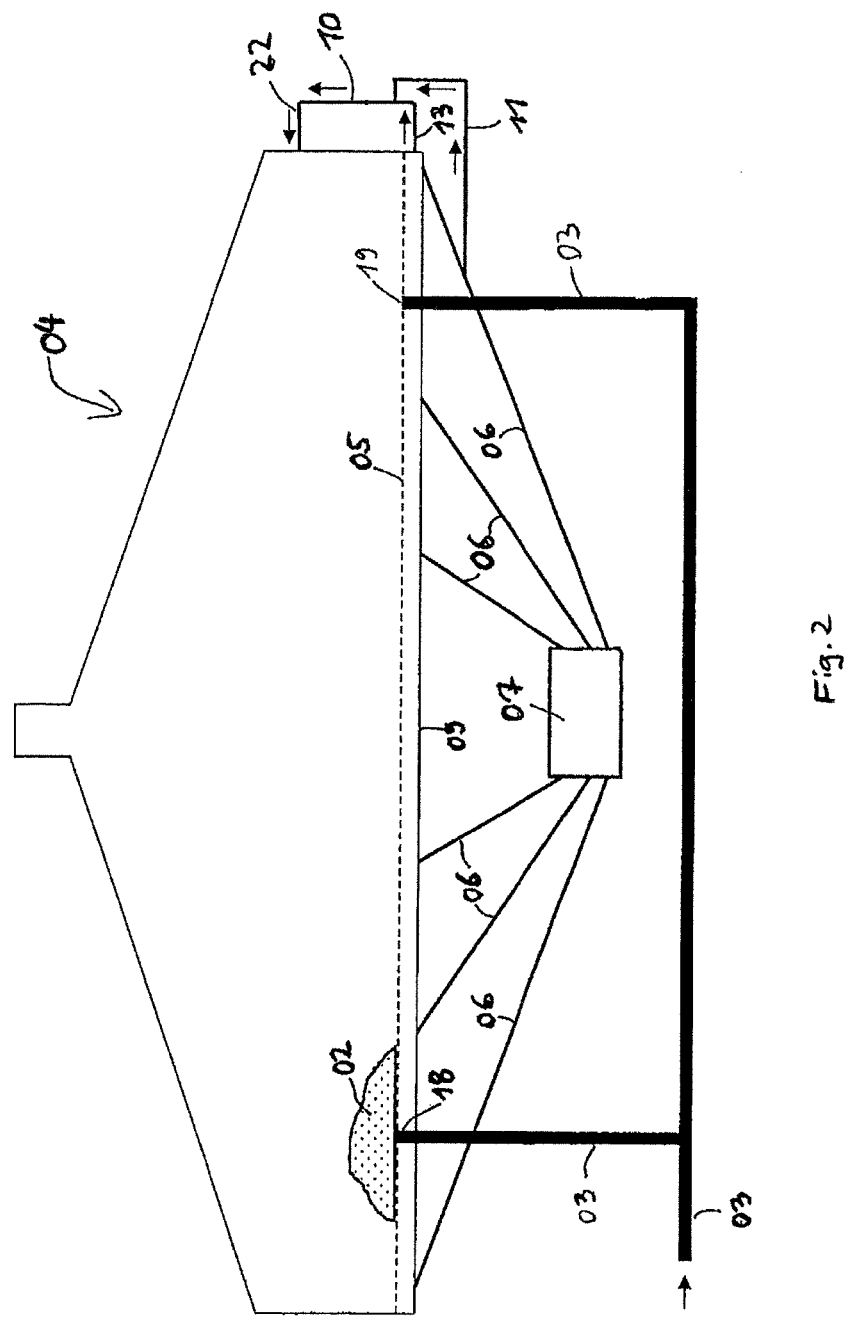
FIG. 2 shows the lauter tun of the brewhouse installation according to FIG. 1 in an enlarged cross-section in a schematic view.

The invention is to be briefly explained on the basis of the illustration of the lauter tun 04 in FIG. 2. FIG. 2 shows the lauter tun 04 shortly after the beginning of the mash transfer. At the beginning of the mash transfer, the right mash inlet opening 19 at one end of the mash transfer duct 03 is completely closed. The left mash inlet opening 18 is completely open, and the mash 02 is pumped into the lauter tun 04 at an initially relatively low speed through the mash inlet opening 18 from below through the false bottom 05 into the area above the false bottom 05. The liquid components contained in the mash 02, namely the wort, run off downward through the openings of the false bottom 05 in the area around the mash inlet opening 18. The gaseous false bottom seal, which has filled the entire space between the bottom side of the false bottom 05 and the top side of the bottom 09 of the lauter tun and all wort collection pipes 06 and the wort collection tank 07 at the beginning of the mash transfer, is now being displaced beginning from the left side of the lauter tun 04 to the right by the wort running off downward in the area of the mash inlet opening 18. Since the wort first runs off downward only in the left area of the lauter tun, the openings in the false bottom 05 in the right area of the lauter tun 04 are not yet blocked by liquid yet, and the gaseous false bottom seal can readily escape upward from below through the openings of the false bottom 05.

The more mash has already been pumped into the lauter tun 04, the higher the likelihood that all gap openings in the false bottom 05 are already blocked by the liquid. To still reliably ensure that the gaseous false bottom seal can escape, several degassing ducts 10 and 11 are provided at the lauter tun 04. The degassing ducts 10 end with their first ends 13 in the space between the bottom side of the false bottom 05 and the top side of the bottom 09 of the lauter tun. The degassing ducts 11 each end with their first ends at one of the wort collection pipes 06. Through the degassing ducts 10, 11, the gaseous false bottom seal can be displaced from the area below the false bottom 05.

The second end 22 of the degassing duct 10 ends in the lauter tun 04 above the surface of the liquid and above the false bottom 05. In turn, the second ends of the degassing ducts 11 end in the degassing duct 10. In this way, it can be ensured that the entire gaseous false bottom seal that is displaced through the degassing ducts 10 and 11 returns into the lauter tun above the false bottom 05. An escape of liquid or gaseous media from the lauter tun 04 through the degassing ducts 10 and 11 is thus reliably precluded.

Once the entire space between the false bottom 05 and the bottom 09 of the lauter tun, all wort collection pipes 06 and the entire wort collection tank 07 have been flooded with wort, the second mash inlet opening 19 is opened, too, and the mash is conveyed into the lauter tun at an increased conveying capacity.

Figure 3:
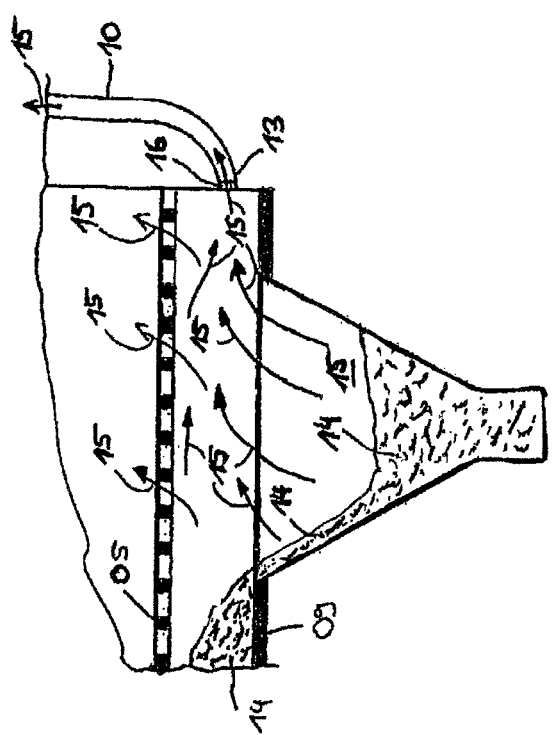
FIG. 3 shows an enlarged section of the lauter tun according to FIG. 2 in a cross-section in a schematic view.

FIG. 3 once more schematically shows the principle of the invention regarding the displacement of the gaseous false bottom seal from the lauter tun below the false bottom 05. FIG. 3 shows the section of the lauter tun 04 in the area of the first end 13 of the degassing duct 10. Owing to the relatively low mash transfer capacity at the beginning of the mash transfer and owing to the one-sided opening of the mash inlet openings, a controlled directed liquid flow of the wort 14 running off through the false bottom 05 is caused.

Owing to the controlled inflow of the wort 14, the gaseous false bottom seal 15 is continuously displaced from the entire area below the false bottom 05 through the degassing ducts 10 and 11 and through the openings of the false bottom 05 that are not yet covered by liquid. Thus, trapping of undesired gas cushions in the volume of the wort 14 is largely avoided. The introduction of oxygen into the wort 14 thus stays negligible. Once the gaseous false bottom seal has been entirely displaced and the area below the false bottom 05 has been completely flooded with wort 14, the mash transfer can be continued in a conventional manner with corresponding mash transfer parameters. At each of the ends of the degassing ducts 10 that end in the lauter tun 04 and in the wort collection pipes 06 or in the wort collection tank 07, sieve elements 16 are arranged that prevent the passage of solid particles after the complete flooding with wort 14.

A pressurized air source 17 is provided for avoiding dilution of the wort also in the case that an aqueous medium is used to evacuate the mash transfer duct 03. The source present for conveying the spent grains into the spent grains silo can be used as the pressurized air source, for example. Commonly, said source is a blower or a compressor, for example.

By way of valves (not illustrated), the pressurized air from the pressurized air source 17 can be introduced into the mash transfer duct 03, and thus the mash remaining in the mash transfer duct 03 after the mash transfer can be conveyed into the lauter tun.

It is also conceivable to aid the removal of the gaseous false bottom seal by using, e.g., vacuum pumps or other devices for suctioning gases as a support. For example, the at least one degassing duct 10 or 11 can be equipped with vacuum pumps. Thus, the gaseous false bottom seal can be removed more quickly.

The invention claimed is:

1. A method for lautering wort using a lauter tun, said method comprising:

introducing a fluid medium in the form of a gaseous medium as a false bottom seal beneath a false bottom of the lauter tun prior to lautering of the wort through the false bottom; and transferring mash into the lauter tun above the false bottom after the introduction of the false bottom seal, wherein wort that runs off in the lauter tun through the false bottom displaces the false bottom seal.

2. The method according to claim 1, in which prior to transferring the mash into the lauter tun, the gaseous false bottom seal fills the space between the false bottom and a bottom of the lauter tun and/or wort collection pipes branching off from the bottom of the lauter tun and/or a wort collection tank arranged at an end of the wort collection pipes and/or a wort collection ring.

3. The method according to claim 1, in which the gaseous medium is free of oxygen.

4. The method according to claim 1, in which during transferring the mash into the lauter tun, the mash is conveyed from below the lauter tun into the lauter tun through at least one closable mash inlet opening arranged in the false bottom.

5. The method according to claim 4, in which at least temporarily, the mash is conveyed in through the different mash inlet openings at different conveying speeds.

6. The method according to claim 5, in which at least temporarily, at least one mash inlet opening stays closed or throttled so as to adjust different conveying speeds.

7. The method according to claim 5, in which the conveying speeds in the different mash inlet openings are equalized once the gaseous false bottom seal has been substantially completely displaced by the wort running off.

8. The method according to claim 1, in which during transferring the mash into the lauter tun, the mash is conveyed into the lauter tun with a conveying capacity that increases at least once starting from an initial conveying capacity.

9. The method according to claim 8, in which the conveying capacity during the mash transfer is increased once the gaseous false bottom seal has been substantially completely displaced.

10. The method according to claim 1, in which at the beginning of transferring the mash into the lauter tun, a fraction of the mash having a low solid content is pumped into the lauter tun until the gaseous false bottom seal has been substantially completely displaced by the wort running off through the false bottom.

11. The method according to claim 1, in which a mash transfer duct through which the mash is conveyed into the lauter tun is evacuated by means of a gaseous pressure medium at the end of transferring the mash into the lauter tun.

12. The method according to claim 1, in which the gaseous medium is an inert gas or a carbon dioxide gas.

13. The method according to claim 1, including displacing said false bottom seal through a degassing duct having a first end in the lauter tun below the false bottom, wherein at least part of the gaseous false bottom seal is displaced through the degassing duct during the transfer of the mash into the lauter tun.

14. The method according to claim 13, including holding back at least in part solid particles still contained in the wort using a sieve element, filter element, and/or a shut-off valve arranged on or within the degassing duct.

* * * * *